(12) United States Patent
Baechtle et al.

(10) Patent No.: US 7,695,198 B1
(45) Date of Patent: Apr. 13, 2010

(54) LATCH PROTECTION CLIP FOR A CONNECTOR

(75) Inventors: David R. Baechtle, Dillsburg, PA (US); Eric Hopkins, Liverpool, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/414,038

(22) Filed: Mar. 30, 2009

(51) Int. Cl.
  *G02B 6/38* (2006.01)
  *G02B 6/36* (2006.01)

(52) U.S. Cl. .............. 385/69; 385/55; 385/56; 385/58; 385/59; 385/60; 385/66; 385/68; 385/75; 385/76; 385/77; 385/78; 385/84; 385/86

(58) Field of Classification Search ............ 385/59, 385/60, 75, 86
  See application file for complete search history.

(56) References Cited

U.S. PATENT DOCUMENTS

| | | | |
|---|---|---|---|
| 5,579,425 A | 11/1996 | Lampert et al. | |
| 5,638,474 A | 6/1997 | Lampert et al. | |
| 6,024,498 A | 2/2000 | Carlisle et al. | |
| 6,196,733 B1* | 3/2001 | Wild | 385/86 |
| 6,250,817 B1* | 6/2001 | Lampert et al. | 385/56 |
| 6,250,949 B1* | 6/2001 | Lin | 439/418 |
| 6,254,418 B1* | 7/2001 | Tharp et al. | 439/352 |
| 6,322,386 B1* | 11/2001 | Tharp et al. | 439/344 |
| 6,357,934 B1 | 3/2002 | Driscoll et al. | |
| 6,511,230 B1* | 1/2003 | Connelly et al. | 385/58 |
| 6,565,262 B2 | 5/2003 | Childers et al. | |
| 6,672,774 B2* | 1/2004 | Theuerkorn et al. | 385/86 |
| 6,672,898 B2* | 1/2004 | Kahle et al. | 439/540.1 |
| 6,709,165 B2* | 3/2004 | De Marchi | 385/55 |
| 7,104,702 B2* | 9/2006 | Barnes et al. | 385/77 |
| 7,204,644 B2* | 4/2007 | Barnes et al. | 385/77 |
| 7,281,859 B2* | 10/2007 | Mudd et al. | 385/76 |
| 7,325,980 B2* | 2/2008 | Pepe | 385/86 |
| 7,555,192 B2* | 6/2009 | Ishii et al. | 385/137 |
| 2006/0115219 A1* | 6/2006 | Mudd et al. | 385/62 |
| 2006/0263011 A1* | 11/2006 | Chen et al. | 385/75 |

* cited by examiner

Primary Examiner—Ryan Lepisto

(57) ABSTRACT

A latch protection clip for a connector mounted at an end of a cable and having a latch extending from a connector housing to a distal end includes a clip body having fingers configured to engage the cable directly behind the connector housing to secure the clip body to the cable. The latch protection clip also includes a trigger extending from the clip body. The trigger has a lever arm extending from the clip body and a trigger handle at an end of the lever arm opposite the clip body. The trigger handle has an outer surface and at least one pocket recessed inward from the outer surface. Each pocket is configured to receive the distal end of a corresponding latch. The trigger is configured to actuate the latch in an actuation direction when the trigger handle is deflected toward the connector housing. The pocket restricts lateral movement of the latch in a direction transverse to the actuation direction of the latch.

20 Claims, 4 Drawing Sheets

LATCH PROTECTION CLIP FOR A CONNECTOR

BACKGROUND OF THE INVENTION

The subject matter herein relates generally to data communication connectors, and more particularly, to a latch protection clip for such connectors.

Various types of data communication connectors have been developed for connecting various components together and for transmitting data therebetween. For example, copper conductor connectors have been developed for connecting copper cables to system components or other copper cables. Additionally, fiber-optic connectors have been developed for connecting optical cables to optical system components such as active or passive devices or to other optical cables. One type of fiber-optic connector is known as a RJ-type connector, which includes a cantilevered latch extending at an angle from an outer surface of a housing to engage a receptacle into which the connector is placed to secure the connector in place. The distal end of the latch extends generally backwardly (that is, away from the "front" end of the connector to be inserted into the receptacle and thus "back" in the direction of the cable). Well-known examples of RJ-type connectors include common telephone cord connectors and LC-type optical fiber connectors. Copper conductor connectors have similar latching features, also known as RJ-type connectors.

One drawback of RJ-type connectors is that if a cable on which the connector is mounted is pulled backwards after the connector is removed from the receptacle, such as to remove the connector and cable from behind the receptacle, the latch can get caught, thereby preventing further movement of the cable without potentially damaging or breaking the latch or the associated connector. Various devices have been proposed to overcome such features of RJ-type connectors. For example, a second cantilevered element similar to the latch, and often called a "trigger", has been included as part of RJ-type connector housings. One example of an RJ-type connector having a trigger element is disclosed in U.S. Pat. No. 5,638,474. The trigger functions as an anti-snag feature for the latch. The trigger also functions to actuate the latch when pressed down. RJ-type connectors having such triggers are not without disadvantages. For instance, because such triggers are formed integral with the housing, the presence of the trigger undesirably lengthens and enlarges the housing somewhat as compared to a comparable LC connector without a trigger. Also, the more complicated housing including the trigger can be more difficult and expensive to mold.

One known solution to such problems is to couple a separate trigger component to the fiber-optic cable. One example of such a separate trigger component is disclosed in U.S. Pat. No. 6,565,262. The trigger component has a circular geometry that attaches to the fiber-optic cable separate from the housing. Such trigger components suffer from the disadvantage of relative movement occurring between the housing, and thus the latch, and the trigger component. In some situations, the trigger component may become misaligned with the latch and potentially cause damage to the latch. For example, if the trigger component is actuated when misaligned with the latch, the trigger component may torque the latch or otherwise cause the latch to move in an abnormal direction, potentially causing damage to the latch.

BRIEF DESCRIPTION OF THE INVENTION

In one embodiment, a latch protection clip is provided for a connector mounted at an end of a cable. The connector has a latch extending from a connector housing to a distal end. The latch protection clip includes a clip body having fingers configured to engage the cable directly behind the connector housing to secure the clip body to the cable. The latch protection clip also includes a trigger extending from the clip body. The trigger has a lever arm extending from the clip body and a trigger handle at an end of the lever arm opposite the clip body. The trigger handle has an outer surface and at least one pocket recessed inward from the outer surface. Each pocket is configured to receive the distal end of a corresponding latch. The trigger is configured to actuate the latch in an actuation direction when the trigger handle is deflected toward the connector housing. The pocket restricts lateral movement of the latch in a direction transverse to the actuation direction of the latch.

Optionally, the pocket may define an anti-rotation feature configured to restrict rotation of the housing and corresponding latch relative to the clip. Two connectors may be provided at ends of different cables, where the clip body engages both cables. The trigger handle may have two pockets configured to receive the distal end of corresponding latches. The pockets restrict rotation of the latches relative to each other. Each pocket may have a base and opposed side walls that extend from the outer surface of the base. The side walls may define abutment surfaces configured to engage sides of the latch to restrict lateral movement of the latch. Optionally, the pocket may receive the latch such that the latch is retained within, and movable with respect to, the pocket during activation of the latch. The latch may have opposed sides that are perpendicular to the distal end, where the pocket receives the latch such that the trigger handle engages the distal end and both opposed sides of the latch.

In another embodiment, a connector assembly is provided that includes a connector configured to be mounted at an end of a cable, where the connector has a connector housing and a latch extending from the connector housing to a distal end. The connector assembly also includes a clip having a clip body and a trigger extending from the clip body. The clip body has fingers configured to engage the cable directly behind the connector housing to secure the clip body to the cable. The trigger has a lever arm extending from the clip body and a trigger handle at an end of the lever arm opposite the clip body. The trigger handle has an outer surface and at least one pocket recessed inward from the outer surface. Each pocket receives the distal end of a corresponding latch, wherein the trigger actuates the latch in an actuation direction when the trigger handle is deflected toward the connector housing. The pocket restricts lateral movement of the latch in a direction transverse to the actuation direction of the latch.

BRIEF DESCRIPTION OF THE DRAWINGS

FIG. 4 is a cross sectional view of the clip assembled with the fiber-optic connector.

DETAILED DESCRIPTION OF THE INVENTION

Figure 1:
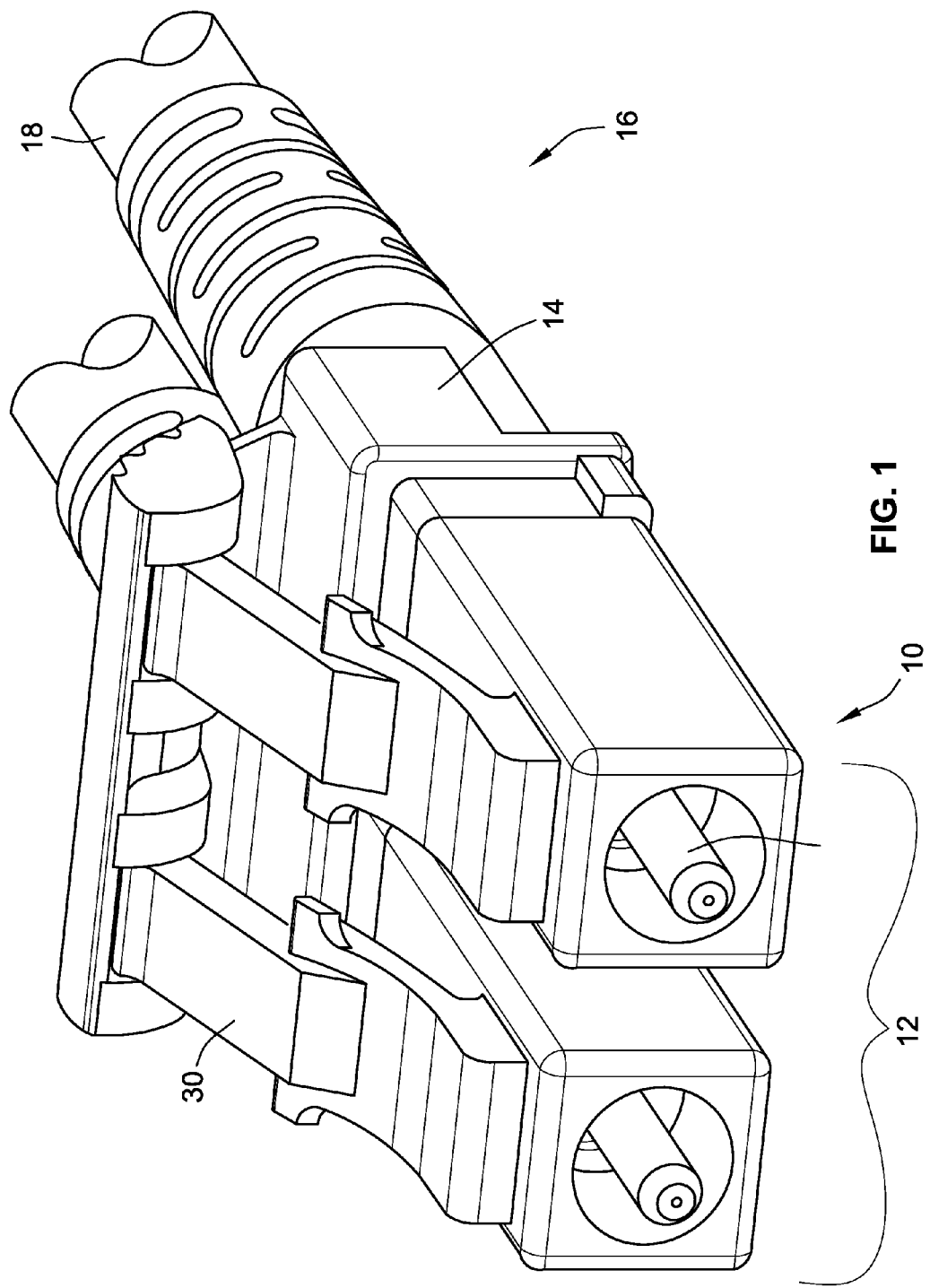
FIG. 1 is a perspective view of a pair of simplex fiber-optic connectors assembled into a duplex optical connector assembly by a clip.

FIG. 1 is a perspective view of a pair of simplex fiber-optic connectors 10 assembled into a duplex fiber-optic connector assembly 12 by a latch protection clip 14. Each fiber-optic connector 10 is mounted to an end of a fiber-optic cable 16. Optionally, the fiber-optic cable 16 may include an outer jacket 18, however the fiber-optic cable 16 may be unjacketed in alternative embodiments. In the illustrated embodiment, the fiber-optic connector 10 constitutes a small form factor fiber-optic connector such as an LC connector, however the subject matter herein is not intended to be limited to such connectors. For example, the subject matter herein may be applicable to other types of connectors, such as copper connectors and others.

The clip 14 is secured to the fiber-optic cable 16 and functions as an anti-snag feature for latches 30 of both fiber-optic connectors 10. For example, the clip 14 blocks the rear portion of the latches 30 to protect the latches 30 from snagging on foreign objects as the fiber-optic connectors 10 are handled and/or manipulated. As will be described in further detail below, the clip 14 also functions as an anti-rotation feature that maintains the relative position of the clip 14 with respect to the fiber-optic connector 10 and/or that maintains the relative position of the fiber-optic connector 10 with respect the fiber-optic cable 16. The clip 14 maintains the relative positions of both fiber-optic connectors within the duplex fiber-optic connector assembly 12 with respect to one another. For example, the clip 14 does not allow one of the fiber-optic connectors 10 to be rotated relative to the other fiber-optic connector 10.

Figure 2:
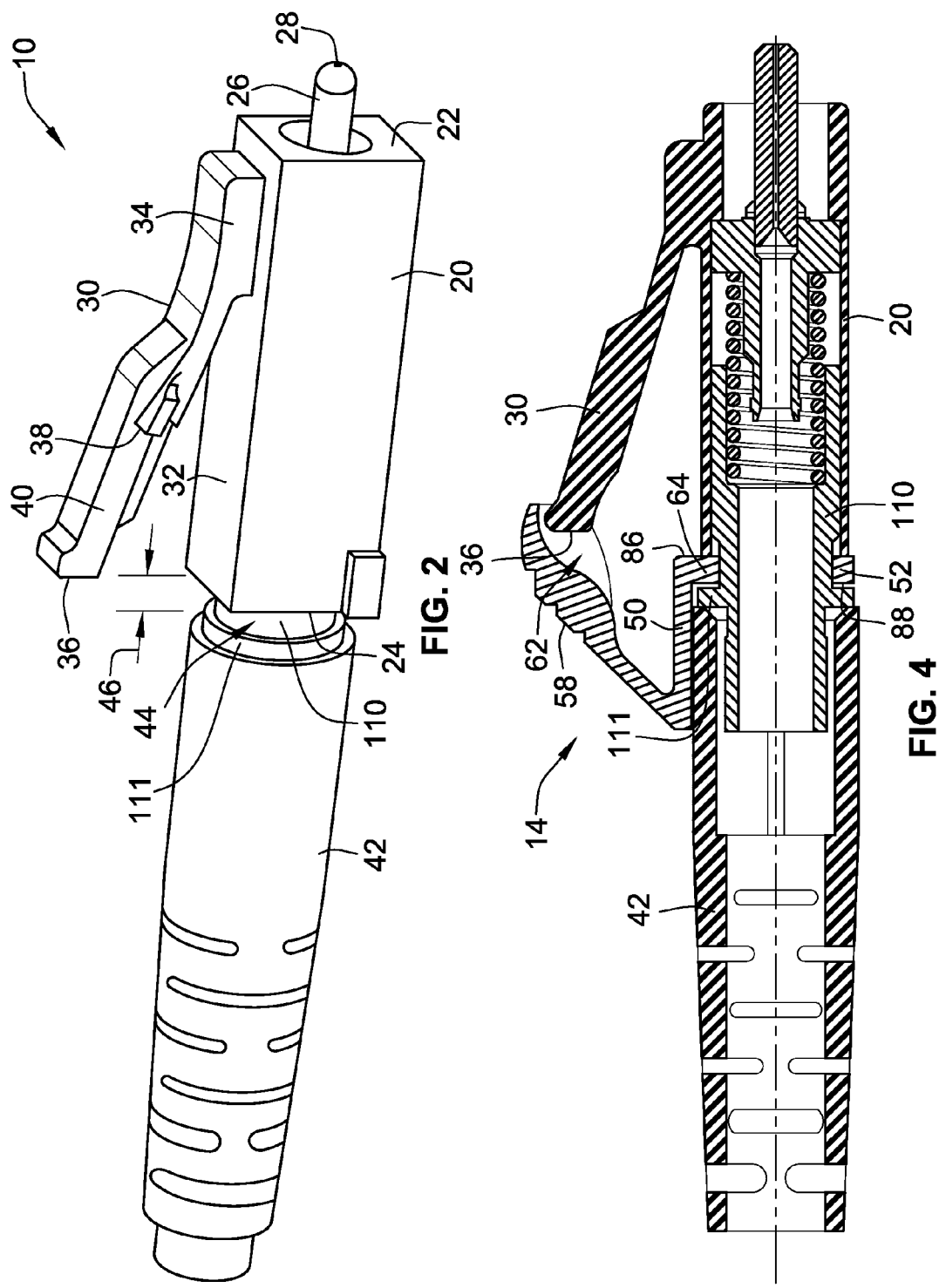
FIG. 2 illustrates one of the simplex fiber-optic connectors illustrated in FIG. 1.

FIG. 2 illustrates one of the simplex optical connectors 10. The fiber-optic connector 10 includes a box shaped housing 20 extending between a front end 22 and a rear end 24. A ferrule 26 is positioned within the housing 20 and holds an optical fiber 28 (shown in phantom) therein.

A cantilevered latch 30 extends at an angle from an outer surface 32 of the housing 20. The latch 30 includes a proximal end 34 attached to the outer surface 32 and a distal end 36 positioned remote from the proximal end 34. The latch 30 is pivotable so that the distal end 36 is movable towards and away from the outer surface 32 of the housing 20. The latch 30 includes two latch surfaces 38 configured for engaging a receptacle (not shown) into which the fiber-optic connector 10 is placed to releasably secure the housing 20 to the receptacle, as is common of fiber-optic connectors 10. The distal end 36 of the latch 30 faces generally rearwardly (that is, away from the front end 22 of the connector 10 and thus back in the direction of the rear end and the fiber-optic cable 16). Optionally, the distal end 36 may be approximately aligned with the rear end 24 of the housing 20. The outer portion of the latch 30 between the latch surfaces 38 and the distal end 36 includes opposed sides 40 that are parallel to one another and perpendicular to the distal end 36.

A strain relief 42 surrounds the fiber-optic cable 16 rearward of the housing 20. In the illustrated embodiment, the strain relief 42 is tubular in shape and has a larger diameter than the fiber-optic cable 16. The housing 20 has a box shaped outer perimeter that is equivalent in size to the strain relief 42. The outer perimeter of the housing 20 is thicker than the diameter of the fiber-optic cable 16. A crimp body 110 forms part of the fiber-optic cable 16 and is provided proximate to the end of the fiber-optic cable 16. The crimp body 110 includes a flange 111 that extends outward from the crimp body 110 and is provided generally between the strain relief 42 and the housing 20.

In an exemplary embodiment, a gap 44 is formed between the flange 110 and the rear end 24 of the housing 20. The gap 44 has a width 46 defining the spacing between the flange and a rear end 24 of the housing 20. The strain relief 42 is spaced further from the rear end 24 than the flange 111. A portion of the fiber-optic cable 16, namely the crimp body 110, is exposed at the base of the gap 44. Another portion of the fiber-optic cable 16, such as the outer jacket 18 (shown in FIG. 1) or even an inner portion of the fiber-optic cable 16 may be exposed in addition to, or in the alternative to, the crimp body 110. The clip 14 (shown in FIG. 1) is received within the gap 44. The clip 14 engages the portion of the fiber-optic cable 16 that is exposed at the base of the gap 44. For example, in the illustrated embodiment, the clip 14 engages the crimp body 110, which is the portion of the cable 16 exposed at the base of the gap 44. However in alternative embodiments, other portions of the cable 16 may be exposed at the base of the gap 44. The flange 111 is positioned between the clip 14 and the strain relief 42. Optionally, the crimp body 110 may have two flanges with the second flange being positioned between the clip 14 and the housing 20. As a result, the clip 14 does not engage the strain relief 42 nor the housing 20. Alternatively, the clip 14 may engage the rear end 24 of the housing 20 and/or the strain relief 42.

Figure 3:
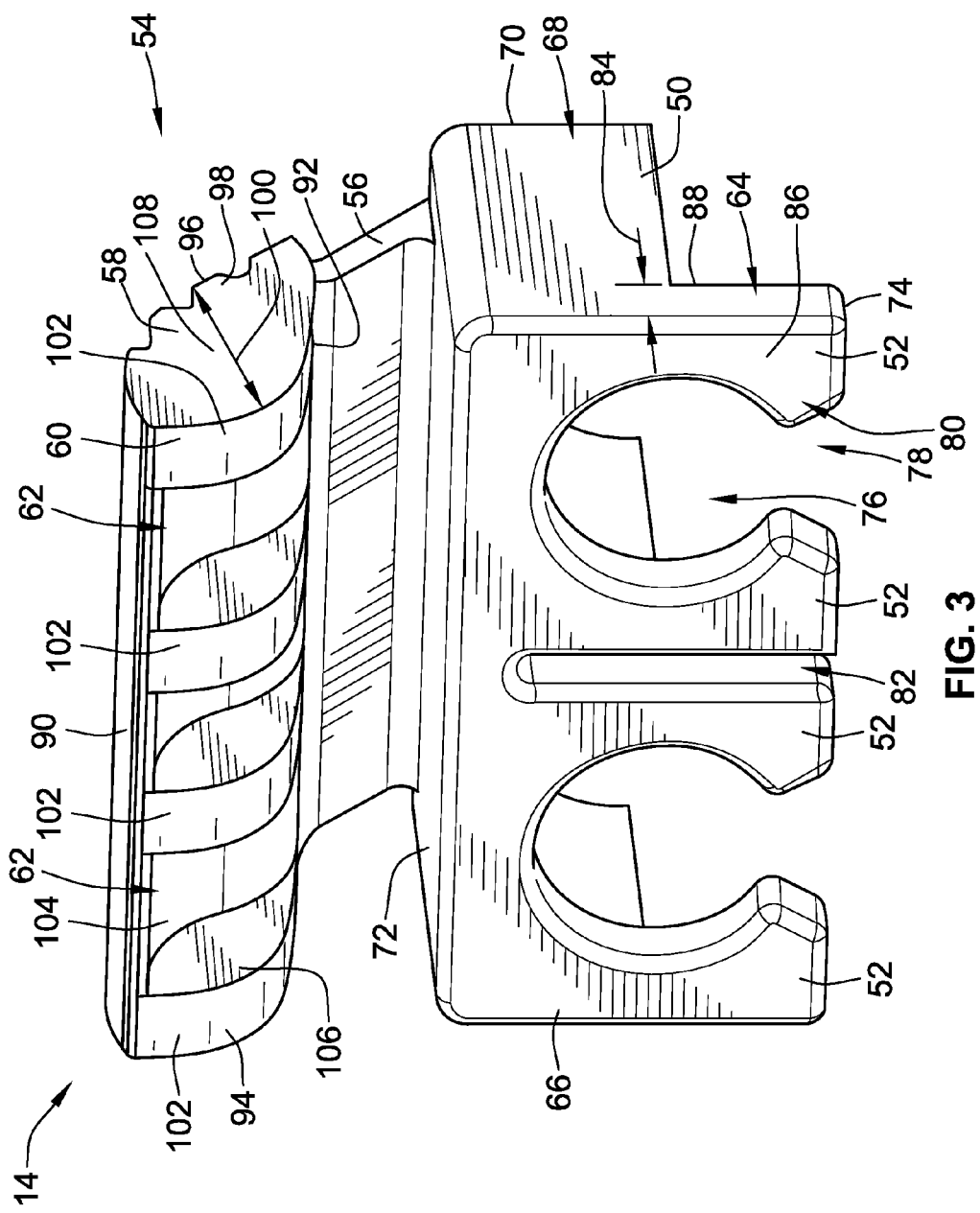
FIG. 3 is a perspective view of the clip shown in FIG. 1 for the duplex fiber-optic connector assembly.

FIG. 3 is a perspective view of the clip 14 for the duplex optical connector assembly 12. The clip 14 includes a clip body 50 having fingers 52 configured to engage the fiber-optic cable 16 (shown in FIG. 2) directly behind the connector housing 20 (shown in FIG. 2) to secure the clip body 50 to the fiber-optic cable 16. The clip 14 also includes a trigger 54 extending from the clip body 50. The trigger 54 has a lever arm 56 extending from the clip body 50 and a trigger handle 58 at an end of the lever arm 56 opposite the clip body 50.

The trigger handle 58 has an outer surface 60 and a pair of pockets 62 recessed inward from the outer surface 60. Each pocket 62 is configured to receive the distal end 36 (shown in FIG. 2) of a corresponding latch 30 (shown in FIG. 2). The trigger 54 actuates the latch 30 in an actuation direction when the trigger handle 58 is deflected toward the connector housing 20. The pocket 62 restricts lateral movement of the latch 30 in a direction transverse to the actuation direction of the latch 30.

The clip body 50 includes a clip section 64 at a front 66 of the clip body 50 and a hood 68 at a rear 70 of the clip body 50. The clip section 64 includes a plurality of the fingers 52 extending generally between a top 72 and a bottom 74. The hood 68 extends along the top 72 of the clip body 50 between the clip section 64 and the rear 70 of the clip body 50. The hood 68 may extend along a portion of the strain relief 42 (shown in FIG. 2) when the clip 14 is coupled o the fiber-optic cable 16.

Two fingers 52 cooperate to form a circular shaped opening 76 through the front 66 of the clip body 50. A channel 78 extends through the bottom 74 to the opening 76. In the illustrated embodiment, four fingers 52 are provided to define two openings 76, thus representing a duplex style clip. Any number of fingers 52 and openings 76 may be provided in alternative embodiments depending on the particular application. Each opening 76 is configured to receive the corresponding fiber-optic cable 16 through the channel 78 when the clip 14 is coupled to the fiber-optic cable 16. The fingers 52 have tip sections 80 proximate to the ends thereof that extend inward into the channel 78. The tip sections 80 capture the fiber-optic cable 16 within the opening 76 by extending at least partially circumferentially around the fiber-optic cable 16 to, in essence, grab the fiber-optic cable 16.

In an exemplary embodiment, two adjacent fingers 52 are separated by a gap 82. The gap 82 allows the adjacent fingers 52 to deflect toward each other when the clip 14 is coupled to the fiber-optic cables 16. For example, the fiber-optic cables 16 have a diameter that is wider than the width of the channel 78 between the tip sections 80. When the fiber-optic cables 16 pass through the channels 78, the fingers 52 that straddle each channel 78 are spread apart to accommodate the fiber-optic cables 16. The gap 82 provides a space that permits the two adjacent fingers 52 to be deflected toward each other.

The clip section 64 has a thickness 84 defined between a forward facing surface 86 and a rearward facing surface 88. The thickness 84 is sized substantially equal to the width 46 of the gap 44 (shown in FIG. 2) between the connector housing 20 and the strain relief 42. The clip section 64 may fit snuggly within the gap 44 such that the surface 86 engages the housing 20 and the surface 88 engages the strain relief 42.

The lever arm 56 of the trigger 54 extends from the hood 68 of the clip body 50. Optionally, the lever arm 56 may extend from the hood 68 proximate to the rear 70 of the clip body 50. The lever arm 56 is angled at an acute angle with respect to the top 72 such that the lever arm 56 extends generally forwardly. The lever arm 56 is integrally formed with the clip body 50, but may be separately provided from, and coupled to, the clip body 50 in an alternative embodiment. The lever arm 56 is deflectable toward the top 72 during operation to actuate the latches 30. For example, when the trigger handle 58 is pressed downward, the lever arm 56 is pivoted toward the top 72.

The trigger handle 58 is provided at an outer end of the lever arm 56. The trigger handle 58 is integrally formed with the lever arm 56, but may be separately provided from, and coupled to, the lever arm 56 in an alternative embodiment. The outer surface 60 generally includes a top 90, a bottom 92, a front 94 and a rear 96. The rear 96 may be angled forwardly from the bottom 92 to the top 90. The rear 96 may have ribs 98 that define a rough surface along the rear 96. The rear 96 is pressed by the user to deflect the trigger 54. The trigger handle 58 has a thickness 100 defined between the front 94 and the rear 96.

The pockets 62 are formed in the trigger handle 58. For example, the outer surface 60 of the trigger handle 58 may include notch-outs that define the pockets 62. In an exemplary embodiment, the pockets 62 are recessed from the front 94 and the bottom 92 of the outer surface 60. The pockets 62 may be defined by rails 102. The rails 102 are spaced apart from one another and the pockets 62 are formed therebetween. In an exemplary embodiment, the pockets 62 are recessed into the trigger handle 58 at least 30% of the thickness 100 of the trigger handle 58. The pockets 62 may be recessed more or less than 30% in alternative embodiments.

The pockets 62 have a base 104 that is generally parallel to the rear 96 and/or the front 94. Optionally, the base 104 may be non-planar. For example, the base 104 may be curved along at least a portion thereof between the bottom and the top of the base 104. The trigger handle 58 also includes opposed side walls 106 that extend from the outer surface 60 to the base 104. The side walls 106 define abutment surfaces that are configured to engage the sides 40 (shown in FIG. 2) of the latch 30 to restrict lateral movement of the latch 30. The side walls 106 are generally parallel to one another and to sides 108 of the trigger handle 58.

FIG. 4 is a cross sectional view of the clip 14 coupled to the fiber-optic cable 16 and connector 10. The outer jacket 18 (shown in FIG. 1) and inner portion of the fiber-optic cable 16 are removed for clarity.

During assembly, the clip 14 is coupled to the fiber-optic cable 16. In the illustrated embodiment, the clip 14 is coupled to the crimp body 110 of the fiber-optic cable 16 that is coupled to the end of the fiber-optic cable 16. The clip 14 is positioned between the housing 20 and the strain relief 42. The clip section 64 of the clip 14 fits in the gap 44 (shown in FIG. 2) between the flange 111 and the housing 20. Optionally, the forward facing surface 86 may engage the housing 20 and the rear facing surface 88 may engage the flange 111. Alternatively, the rear facing surface 88 may engage the strain relief 42, such as when the flange 111 and/or the crimp body 110 are not provided. The fingers 52 (shown in FIG. 3) snuggly fit around and engage the crimp body 110 of the fiber-optic cable 16. Because the fiber-optic cable 16 and the crimp body 110 are circular and the opening 76 (shown in FIG. 3) is also circular, the clip 14 tends to rotate or spin around the fiber-optic cable 16. The trigger handle 58 engages the latch 30 to resist rotation of the clip body 50 about the fiber-optic cable 16. For example, the pockets 62 receive the latches 30 such that the trigger handle 58 engages the distal end 36 and both opposed sides 40 (shown in FIG. 2) of the latches 30. The pockets 62 thus define an anti-rotation feature that restricts rotation of the housing 20 and corresponding latch 30 relative to the clip 14. The pockets 62 may also restrict rotation of the housings 20 and latches 30 relative to each other. For example, the pockets 62 do not allow the latches 30 to move laterally which restricts rotation of the latches 30 with respect to the clip 14.

During operation, the trigger handle 58 may be pressed downward toward the clip body 50 to simultaneously actuate both latches 30. The pockets 62 receive the latches 30 such that the latches 30 are retained within, and are movable with respect to, the pockets 62 during actuation of the latch 30. For example, the base 104 (shown in FIG. 3) pivots about the distal end 36.

Figure 5:
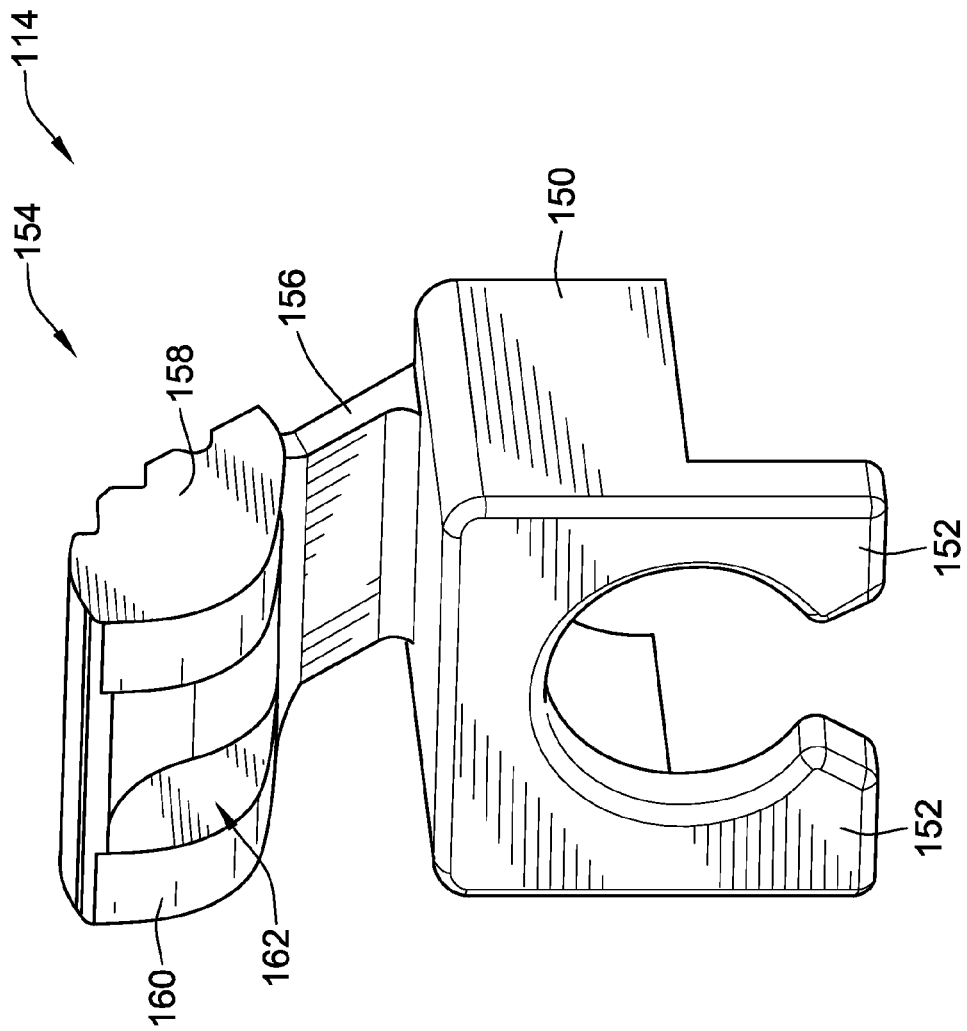
FIG. 5 is a perspective view of an alternative clip for a simplex fiber-optic connector.

FIG. 5 is a perspective view of an alternative clip 114 utilized with one of the simplex optical connectors 10. The clip 114 differs from the clip 14 (shown in FIG. 3) in that the clip 114 is configured to be coupled to only one of the simplex optical connectors, and thus constitutes a simplex style clip.

The clip 114 includes a clip body 150 having fingers 152 configured to engage one of the fiber-optic cables 16 (shown in FIG. 2) directly behind the connector housing 20 (shown in FIG. 2) to secure the clip body 150 to the fiber-optic cable 16. The clip 114 also includes a trigger 154 extending from the clip body 150. The trigger 154 has a lever arm 156 extending from the clip body 150 and a trigger handle 158 at an end of the lever arm 156 opposite the clip body 150. The trigger handle 158 has an outer surface 160 and one pocket 162 recessed inward from the outer surface 160. The pocket 162 is configured to receive the distal end 36 (shown in FIG. 2) of a corresponding latch 30 (shown in FIG. 2).

During operation, the trigger 154 actuates the latch 30 in an actuation direction when the trigger handle 158 is deflected toward the connector housing 20. The pocket 162 restricts lateral movement of the latch 30 in a direction transverse to the actuation direction of the latch 30. The trigger handle 158 engages the latch 30 to resist rotation of the clip body 150 about the fiber-optic cable 16. For example, the pocket 162 receives the latch 30 such that the trigger handle 158 engages the distal end 36 and both opposed sides 40 (shown in FIG. 2) of the latch 30. The pocket 162 thus defines an anti-rotation feature that restricts rotation of the housing 20 and corresponding latch 30 relative to the clip 114.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A latch protection clip for a connector mounted at an end of a cable having a strain relief, the connector having a latch extending from a connector housing to a distal end, the latch protection clip comprising:
    a clip body extending between a front and a rear, the clip body having fingers at the front being configured to engage the cable behind the connector housing and configured to engage the cable in front of an end of the strain relief to secure the clip body to the cable, the clip body having a hood extending rearward from the fingers, the hood extending along a portion of the strain relief; and
    a trigger extending from the hood of the clip body, the trigger having a lever arm extending from the clip body and a trigger handle at an end of the lever arm opposite the clip body, the trigger handle having an outer surface and a pocket recessed inward from the outer surface, the pocket configured to receive the distal end of the latch, wherein the trigger is configured to actuate the latch in an actuation direction when the trigger handle is deflected toward the connector housing, the pocket restricting lateral movement of the latch in a direction transverse to the actuation direction of the latch.

2. The clip of claim 1, wherein the pocket defines an anti-rotation feature configured to restrict rotation of the housing and the latch relative to the clip.

3. The clip of claim 1, wherein the clip is configured for use with two connectors, each connector mounted to a cable and each connector having a latch extending from a connector housing to a distal end, the clip body is configured to engage the two cables, the trigger handle having two pockets each configured to receive the distal end of the corresponding latch, the pockets restricting rotation of the latches relative to each other.

4. The clip of claim 1, wherein the pocket has a base and opposed side walls that extend from the outer surface to the base, the side walls defining abutment surfaces configured to engage sides of the latch to restrict lateral movement of the latch.

5. The clip of claim 1, wherein a forward facing portion of the outer surface includes a notch out defining the pocket.

6. The clip of claim 1, wherein the pocket receives the latch such that the latch is retained within, and movable with respect to, the pocket during activation of the latch.

7. The clip of claim 1, wherein the latch has opposed sides that are perpendicular to the distal end of the latch, the pocket receives the latch such that the trigger handle engages the distal end of the latch and both opposed sides of the latch.

8. The clip of claim 1, wherein the trigger handle has a thickness measured in a direction along a longitudinal axis of the latch, the pocket being recessed into the trigger handle at least 30% of the thickness of the trigger handle.

9. The clip of claim 1, wherein the clip body extends between a front and rear, the front being positionable adjacent a rear end of the connector housing, the lever arm extending from the clip body proximate the rear of the clip body in a direction toward the front of the clip body.

10. The clip of claim 1, wherein the clip body has a front extending between a top and a bottom, the lever arm extending from the top, the fingers having a circular opening therebetween that is open at the bottom of the clip body, the clip body being configured to receive the cable into the opening through the bottom, the front of the clip body facing the connector housing.

11. The clip of claim 1, wherein the fingers are configured to be received between the connector housing and the strain relief on the cable such that the fingers engage the cable and are held between the connector housing and the strain relief, the trigger handle engaging the latch to resist rotation of the clip body about the cable.

12. The clip of claim 1, wherein the clip is configured for use with two connectors, each connector mounted to a cable and each connector having a latch extending from a connector housing to a distal end, the clip body is configured to engage the two cables to define a duplex assembly, the trigger handle having two pockets each configured to receive the distal end of the corresponding latch, the trigger handle being configured to simultaneously actuate both latches.

13. The clip of claim 1, wherein the fingers are configured to be sandwiched between the connector housing and the end of the strain relief such that the fingers abut both the connector housing and the end of the strain relief.

14. The clip of claim 1, wherein the clip body has a length between the front and the rear, the fingers have front surfaces and rear surfaces, the fingers having a finger length measured between the front surfaces and the rear surfaces, the finger length being less than half of the length of the clip body.

15. The clip of claim 1, wherein the hood defines a hollow space rearward of the fingers, the hollow space receiving a portion of the strain relief.

16. A connector assembly comprising:
    a connector configured to be mounted at an end of a cable forward of an end of a strain relief attached to the cable, the connector having a connector housing and a latch extending from the connector housing to a distal end; and
    a clip having a clip body and a trigger extending from the clip body, the clip body extending between a front and a rear, the clip body having planar fingers at the front of the clip body and remote from the rear of the clip body, the fingers being configured to engage the cable behind the connector housing and being configured to engage the cable in front of the end of the strain relief to secure the clip body to the cable, the trigger having a lever arm extending from the clip body and a trigger handle at an end of the lever arm opposite the clip body, the trigger handle having an outer surface and a pocket recessed inward from the outer surface, the pocket receiving the distal end of the latch, wherein the trigger actuates the latch in an actuation direction when the trigger handle is deflected toward the connector housing, the pocket restricting lateral movement of the latch in a direction transverse to the actuation direction of the latch.

17. The assembly of claim 13 wherein two connectors are provided at ends of different cables, each connector having a connector housing and a latch extending from the connector housing, the clip body being configured to engage both cables, the trigger handle having two pockets configured to receive the distal ends of corresponding latches, the pockets restricting rotation of the latches relative to each other.

18. The assembly of claim 16, wherein the fingers are sandwiched between the connector housing and the end of the strain relief such that the fingers abut both the connector housing and the end of the strain relief.

19. The assembly of claim 16, wherein the clip body has a length between the front and the rear, the fingers have front surfaces and rear surfaces, the fingers having a finger length measured between the front surfaces and the rear surfaces, the finger length being less than half of the length of the clip body.

20. The assembly of claim 16, wherein the clip body includes a hollow hood extending rearward from the fingers, the hollow hood receiving a portion of the strain relief.

* * * * *